Aug. 18, 1942.  T. G. MYERS  2,293,617
ADJUSTABLE RATIO BELT TRANSMISSION MECHANISM
Filed July 1, 1939  8 Sheets-Sheet 5

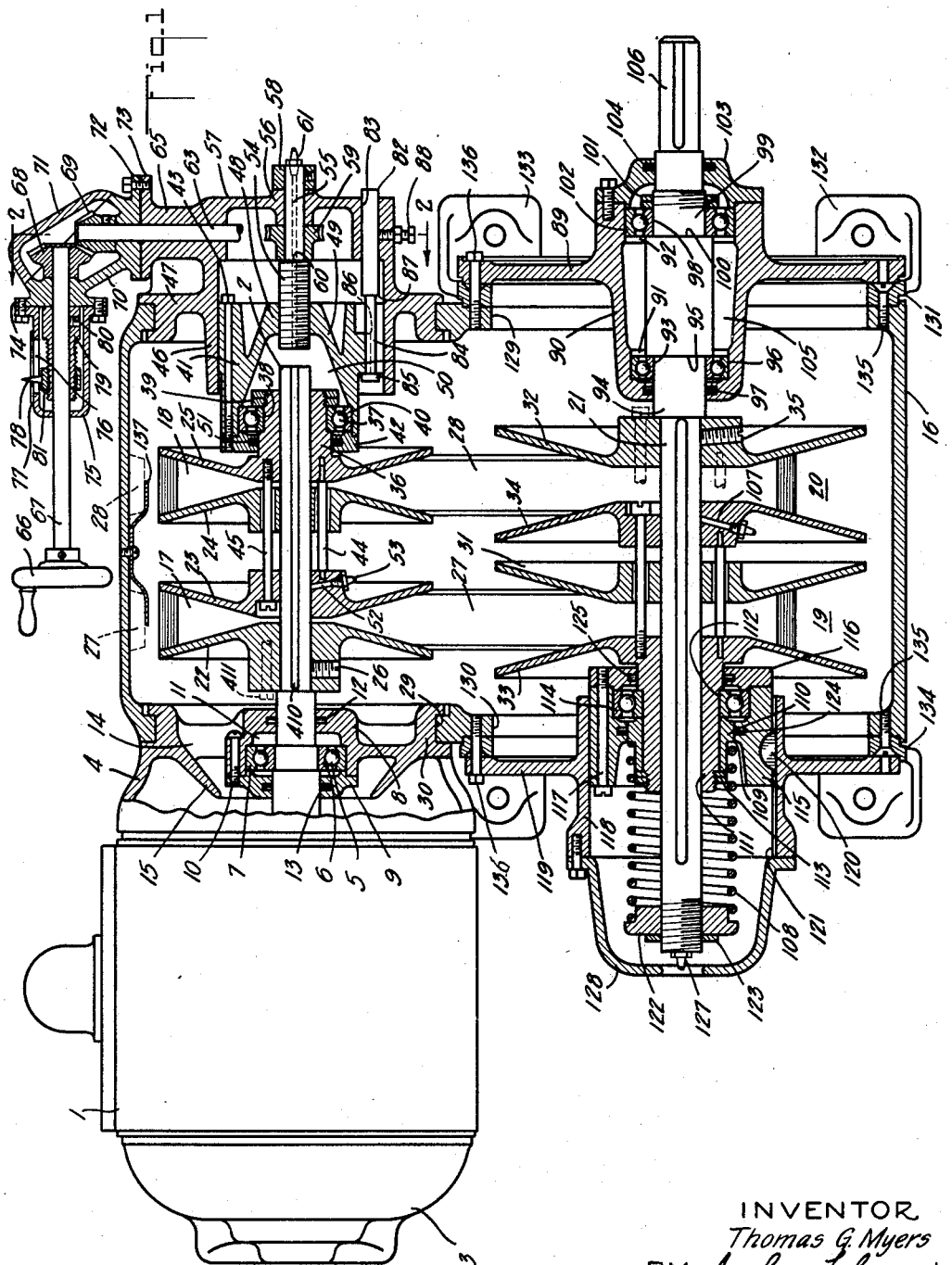

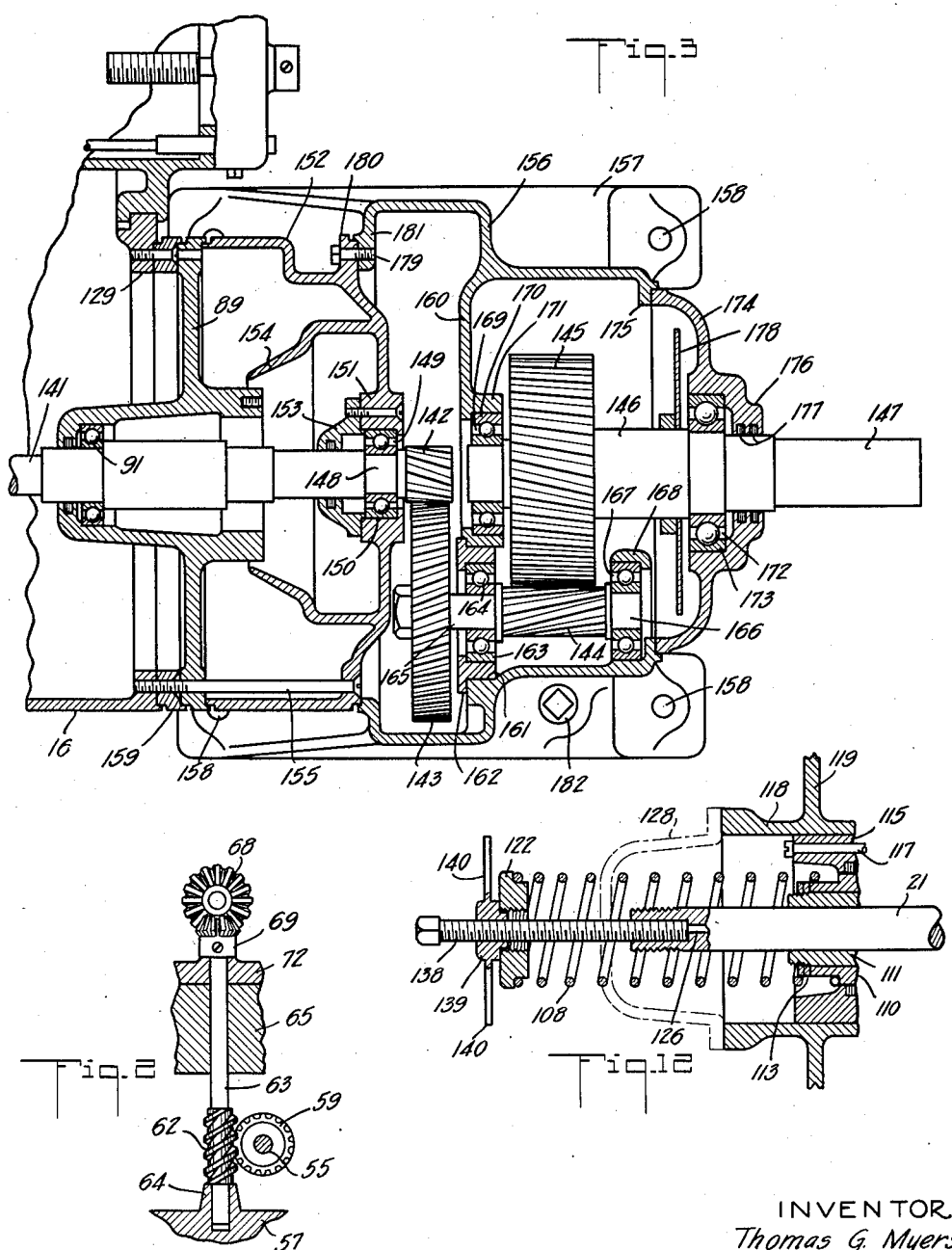

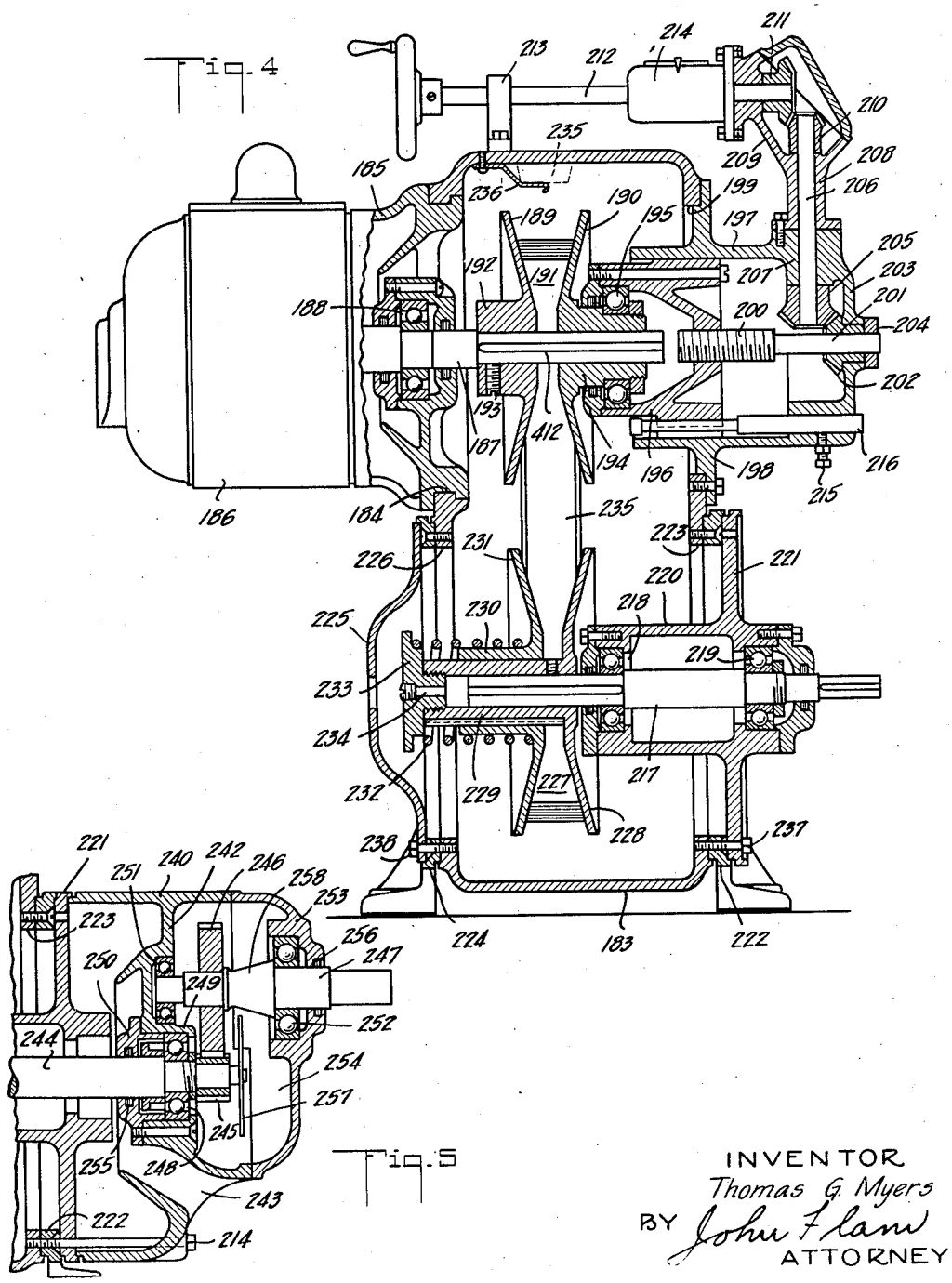

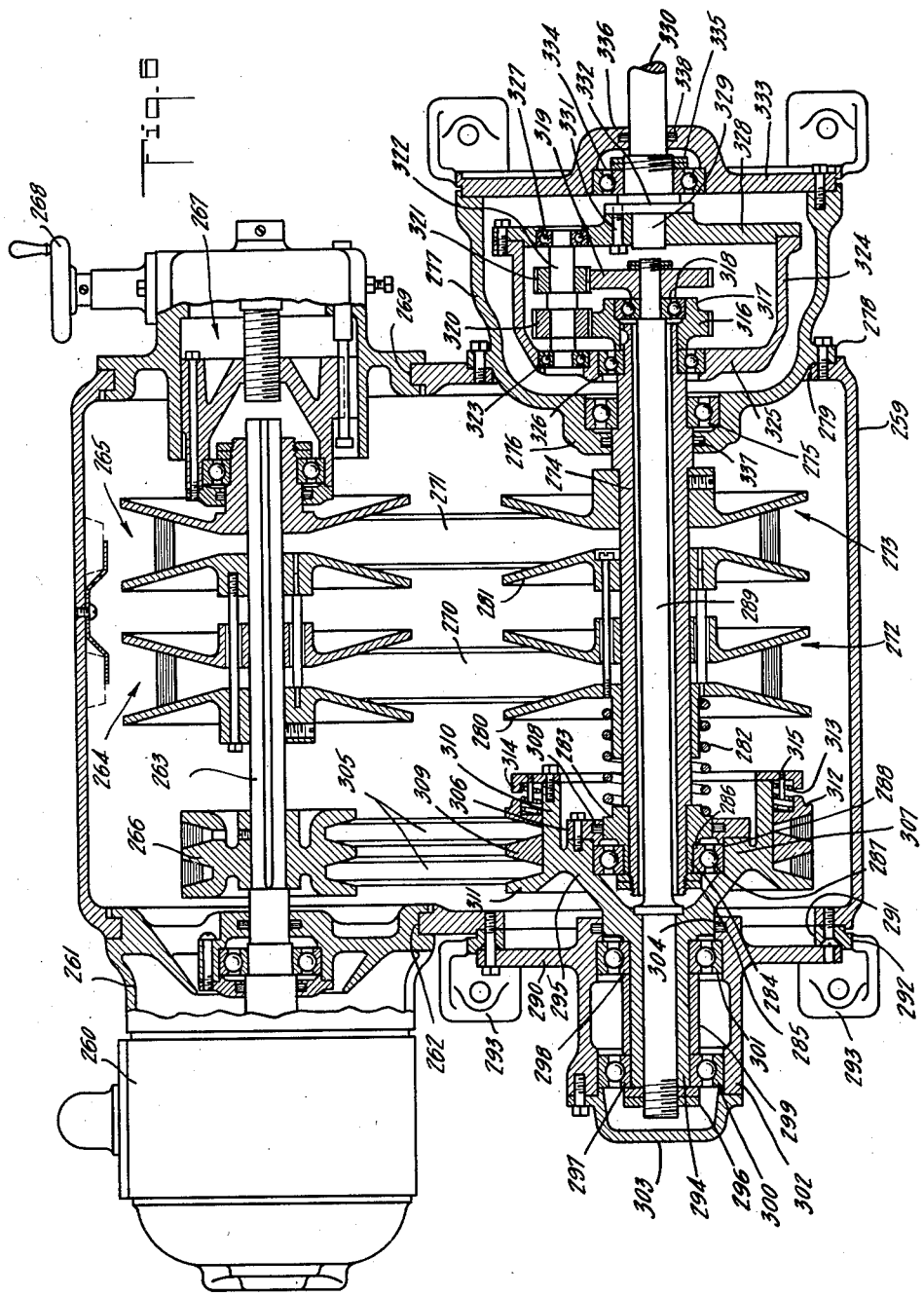

INVENTOR
Thomas G. Myers
BY John Flam
ATTORNEY

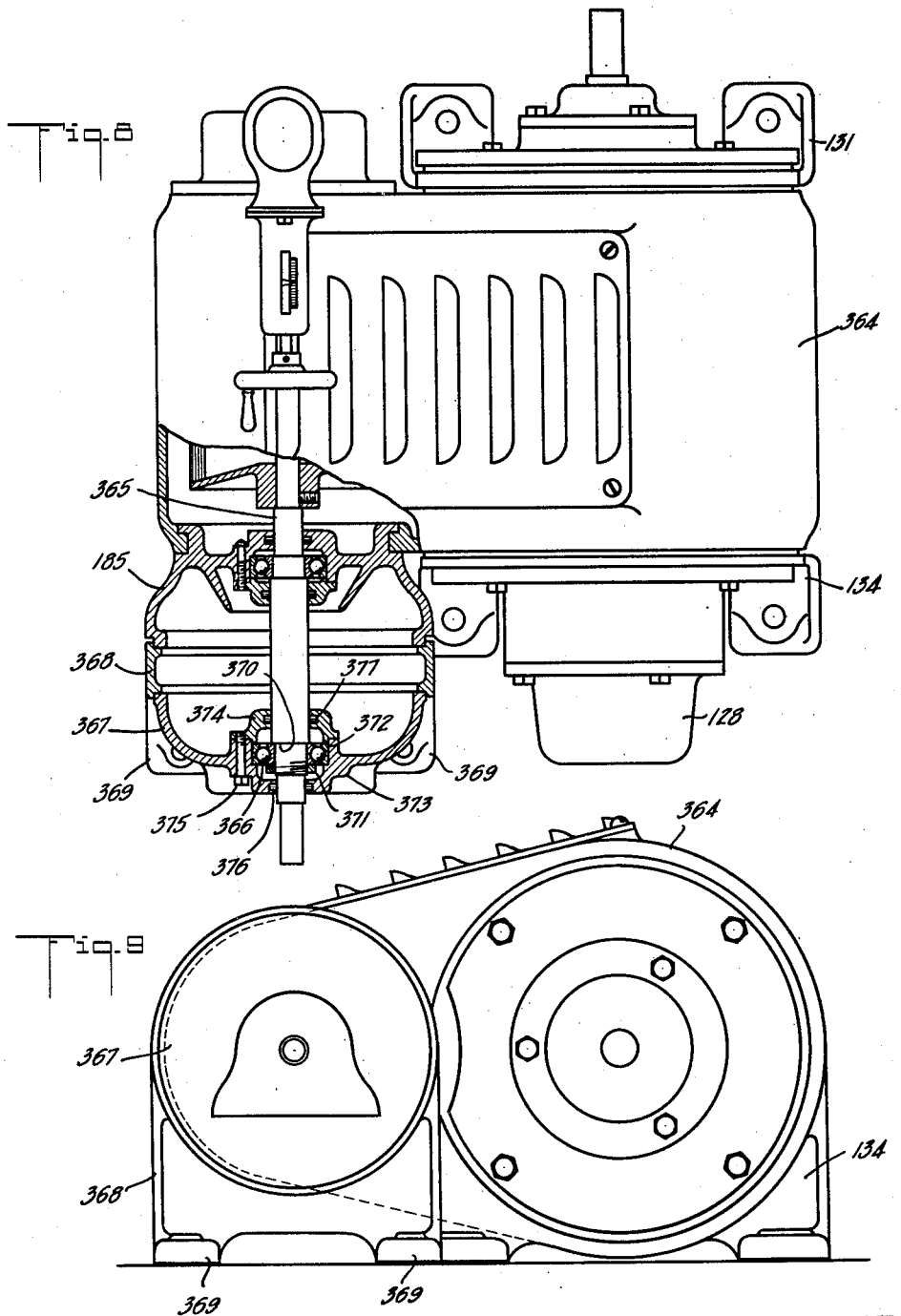

Aug. 18, 1942.    T. G. MYERS    2,293,617
ADJUSTABLE RATIO BELT TRANSMISSION MECHANISM
Filed July 1, 1939    8 Sheets-Sheet 7
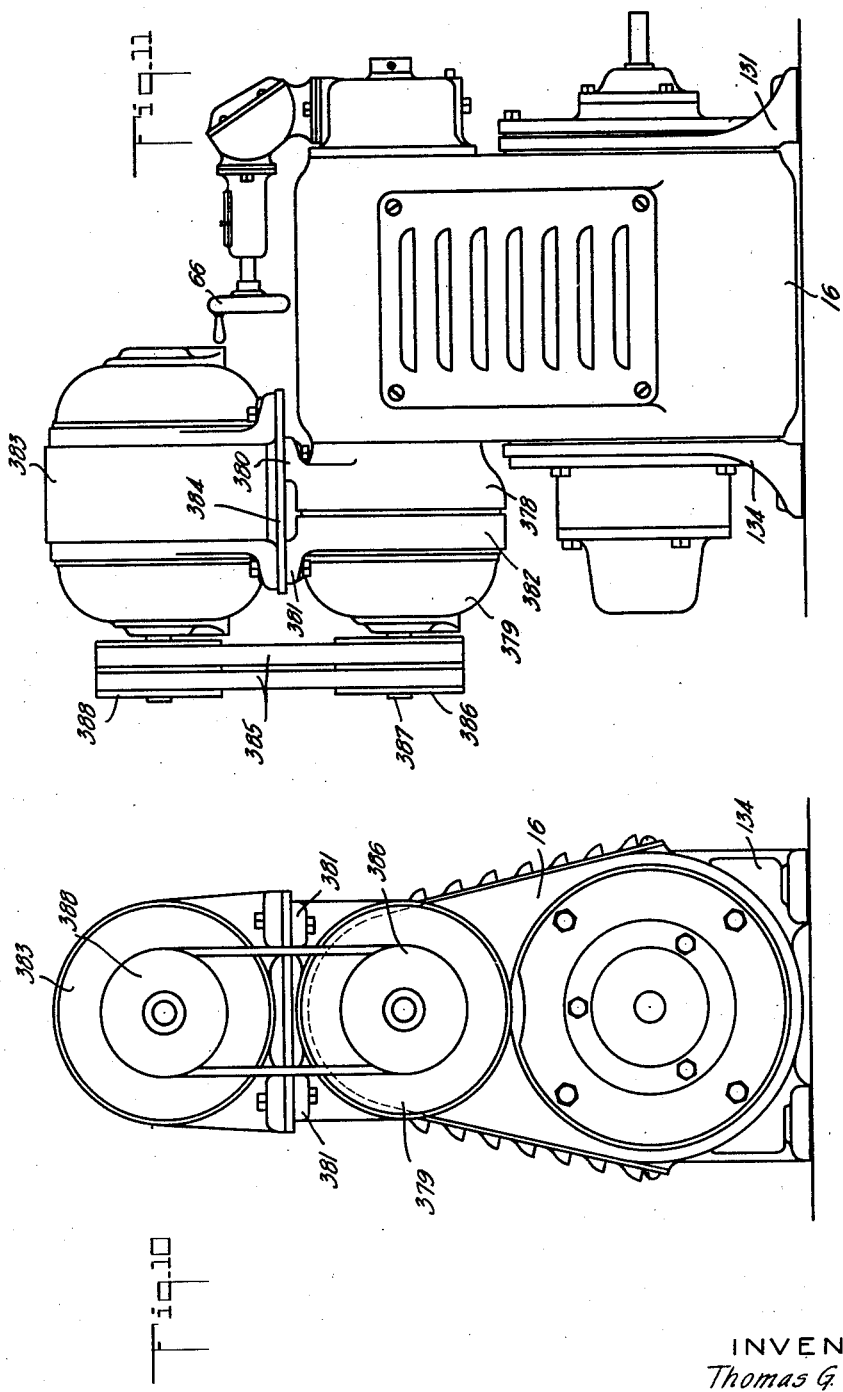
INVENTOR
Thomas G. Myers
BY John Flam
ATTORNEY Patented Aug. 18, 1942

2,293,617

UNITED STATES PATENT OFFICE 2,293,617

ADJUSTABLE RATIO BELT TRANSMISSION MECHANISM

Thomas G. Myers, Los Angeles, Calif., assignor to U. S. Electrical Motors, Inc., Los Angeles, Calif., a corporation of California Application July 1, 1939, Serial No. 282,454

28 Claims. (Cl. 74—230.17)

This invention relates to a mechanism for transmitting power by the aid of pulleys and belts; and more particularly to a mechanism in which the ratio of the transmission may be adjusted by varying the effective diameter of one or more of the pulley structures.

Such pulley structures usually employ a pair of sections, having opposed inclined faces, adapted to contact opposite faces of a wedge-shaped or edge active belt. The sections are made relatively axially adjustable so as to adjust the spacing between the inclined surfaces. The farther apart these surfaces are, the closer the belt approaches the axis to contact these surfaces. Accordingly the effective pulley diameter is decreased by moving the surfaces apart. Conversely, when the sections are brought toward each other, the belt is urged outwardly from the axis, and the effective pulley diameter is increased.

In adapting such pulley structures to various requirements, such as prescribed ranges of ratio transmission, output speed, the power to be transmitted, as well as the space or location of the mechanism, it has been necessary to manufacture a large variety of specially designed parts, such as casings, and bearings, sizes of belts, etc.

It is one of the objects of this invention to make it possible to utilize standardized parts to fulfill the various requirements of a wide variety of installations.

It is another object of this invention to improve in general the structure and mode of operation of mechanism incorporating such variable diameter pulleys.

In a prior application, filed July 27, 1936, in the name of George T. Pfleger, under Serial No. 92,752, there is described a mechanism of this general type. A casing is provided for housing the pulley structure as well as for supporting a source of power, such as an electric motor. The mechanism is characterized by the capability of the casing to be swung about the axis of one of the pulley structures, in order to make it possible to place the mechanism in the most favorable manner with respect to the space to be occupied by it, and with respect to the position of the load to be driven by it. One aspect of the present invention is a further extension of these ideas described in said prior application.

By the aid of the present invention, the assembly and removal of the pulleys and belts are rendered simple; and this is possible even when there are multiple belts for transmitting large power between the driving and driven shafts.

Especially when an electric motor is utilized as the source of power, the speed reduction and horsepower possible with a single set of belts is at times inadequate; and this is true although the change in ratio obtained by the adjustment in the effective pulley diameters is made as large as practicable. In such instances reduction gearing is resorted to, of the single or multiple type; and even a differential gear system might be used to bring the speed of the driven shaft substantially to zero. It is another object of this invention to make it possible readily to utilize any of these types of reduction gears optionally with any of mechanisms.

This invention possesses many other advantages, and has other objects which may be made more easily apparent from a consideration of several embodiments of the invention. For this purpose there are shown a few forms in the drawings accompanying and forming part of the present specification. These forms, which illustrate the general principles of my invention, will now be described in detail; but it is to be understood that this detailed description is not to be taken in a limiting sense, since the scope of my invention is best defined by the appended claims.

Referring to the drawings:

Figure 1 is a view mainly in section of an embodiment of the invention, illustrating a transmission mechanism in which the driven shaft has no supplemental reduction gearing;

Fig. 2 is a detail section taken along plane 2—2 of Fig. 1;

Fig. 3 is a fragmentary sectional view illustrating the addition of double reduction gearing to the driven shaft of the embodiment of Fig. 1;

Fig. 4 is a view mainly in section of a modification of the invention;

Fig. 5 is a fragmentary sectional view, similar to Fig. 3 illustrating another form of reduction gearing that may be utilized with the apparatus illustrated in Figs. 1 and 4;

Fig. 6 is a view similar to Fig. 1 of a further modification of the invention in which a reduction gear of the differential type is utilized for reducing the output speed;

Fig. 8 is a top plan view, partly in section, of a still further modification of the invention;

Fig. 9 is a side elevation of the form of the invention illustrated in Fig. 8;

Fig. 10 is an end elevation of a further modified form of the invention;

Fig. 11 is a side elevation of the embodiment illustrated in Fig. 10;

Fig. 12 is a detail section, illustrating the manner in which certain of the parts may be removed and replaced;

Figure 7:
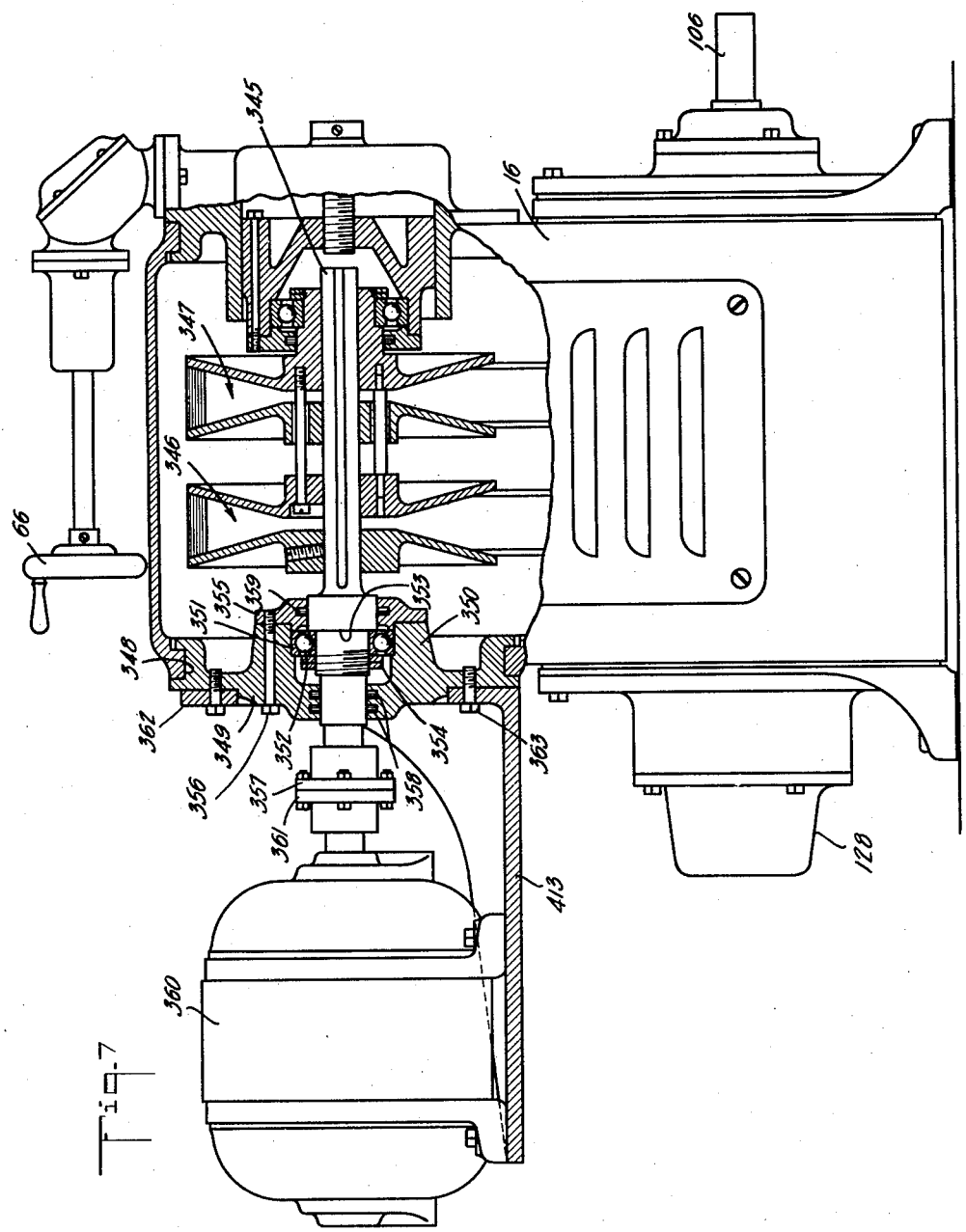
Fig. 7 is a view partly in section of a still further modified form of the invention.

In the form of the invention illustrated in Figs. 1, 2, 3 and 12, the source of power is indicated as a motor 1 (Fig. 1). This motor has an extended driving shaft 2. As is common in motors of this type, the end bells 3 and 4 are provided with appropriate bearing structures for rotatably supporting the driving shaft 2. In the present instance the bearing structure in end bell 4 is indicated in section. It may include, for example, a series of balls 5 operating between the inner race 6 mounted on an enlarged portion of the shaft 2, and an outer race 7 mounted in the central hub 8. This central hub 8 is shown as integral with the end bell 4. In order to hold the bearing structure in place a cap 9 may be provided for the boss 8. This cap has a flange which engages the outer race 7 and is held in place as by a plurality of screws 10 passing through a portion of the hub 8. Surrounding the bearing structure is a lubricant chamber 11 formed by the aid of the boss 8 and cap 9. Felt lubrication retaining washers 12 and 13 may be accommodated respectively in annular internal grooves in the boss 18 and in the cap 9 for retaining the lubricant in the chamber 11.

The end bells 3 and 4 may be provided, as is usual, with ventilating passageways. Thus for example the end bell 4 is illustrated as having an opening 14 therein for the passage of air into or out of the motor frame 2. This end bell is further shown as provided with the inclined deflector flange 15.

All of this motor bearing structure is merely illustrative as other forms of rotary supports for the driving shaft 2 may be utilized.

In the present instance the motor 1 is shown as supported on a wall of a frame or casing 16 which serves to enclose and support the important elements of the variable ratio transmission mechanism, such as the variable diameter pulley structures and the belts. For this purpose the left hand wall of frame 16 is shown as provided with an aperture 29. The edge of this aperture is adapted to cooperate with a grooved flange 30 shown as integral with the end bell 4. This flange may be interrupted, and the edge of aperture 29 may be similarly interrupted to provide a bayonet connection between the end bell 4 and the casing or frame 16, somewhat in the manner of a breech lock. As is well known, the elements of such a breech lock mechanism may be separated or united by relative angular rotation of the two elements to establish the connection or to disconnect the members.

In this form of the invention, a multiple belt arrangement is illustrated involving a pair of driving pulley structures 17 and 18. These driving pulley structures are mounted in driving relation upon the shaft 2 in a manner to be hereinafter described. These pulley structures 17 and 18 are respectively in driving relation to a corresponding pair of driven pulley structures 19 and 20 mounted on a driven shaft 21.

Each of the variable diameter pulley structures 17 and 18 may comprise a pair of pulley sections 22—23 and 24—25. At least one of the pulley sections such as 22 may be axially fixed to the shaft 2 as by appropriate keys or set screws. Thus through the hub of pulley section 22 there passes a set screw 26 for maintaining pulley section 22 in fixed driving relation to the shaft 2. Pulley section 24 is maintained against axial movement on the shaft by means of a connection to pulley section 22, which will be presently described.

The pairs of pulley sections 22—23 and 24—25 have oppositely inclined faces which engage opposite sides of the edge active belts 27 and 28. By adjusting the relative axial position of pulley section 23 with respect to pulley section 22, the effective diameter of the pulley structure 17 may be adjusted. Similarly by varying the relative axial position of pulley section 25 with respect to fixed pulley section 24, the effective diameter of pulley structure 18 may be adjusted. As pulley section 23 approaches pulley section 22, the belt 27 is forced radially outwardly and the effective diameter is increased. Conversely, as pulley section 23 recedes from pulley section 22, the belt 27 is allowed to approach radially toward the axis of the shaft 2, and the effective pulley diameter is reduced.

The adjustments of the axially movable pulley sections 23 and 25 are accompanied by cooperating adjustments of the variable diameter pulley structures 19 and 20 that are mounted upon the driven shaft 21. Thus if the effective diameter of pulley structures 17 and 18 is reduced from the maximum diameter illustrated in Fig. 1, the effective diameters of pulley structures 19 and 20 are correspondingly increased. Further, in order to keep the belts 27 and 28 in alinement between the driving and driven pulley structures, the right hand pulley sections 31 and 32 of pulley structures 19 and 20 respectively are fixed against axial movement on the shaft 21, while the oppositely facing pulley sections 33 and 34 are axially movable. As illustrated in connection with axially fixed pulley section 32, this pulley section may be held in fixed position as by the aid of a set screw 35 passing through the hub of this pulley section. As before, the other fixed pulley section 31 is joined to the fixed section 32, so as to be held against axial movement on the shaft.

The mechanism for causing these pulley structures to be adjusted will now be described. In the present instance, the driving pulley structures 17 and 18 are arranged to be positively adjusted, and the driven pulley structures 19 and 20 are arranged to be automatically adjusted in response to the adjustment of the pulley structures 17 and 18.

The positive adjustment means for the adjustable pulley sections 23 and 25 includes a thrust bearing structure mounted on the hub 36 of the adjustable pulley section 25. In this way the thrust bearing structure may be moved axially while yet permitting the driving pulley structures and their associated shaft 2 to rotate. In the present instance this thrust bearing structure includes a number of balls 37. The inner race 38 of the ball bearing structure is shown as mounted on a reduced portion of the hub 36 and held in place against a shoulder on the hub as by one or more nuts 39 threaded on the end of the hub 36. The outer race 40 of the thrust bearing structure is shown as accommodated within a cylindrical member 41 and abutting an internal shoulder therein. A cap 42 may be fastened over the left hand edge of the member 41 as by a plurality of screws 43 passing through the cylindrical member 41 and threaded into the cap 42.

This cylindrical member 41 is arranged to be axially moved but restrained from rotation. As it is moved axially, the thrust bearing structure is correspondingly moved without interfering with the rotation of the rotary parts.

The axial movement of section 25 is transmitted to the corresponding adjustable pulley section 23 of the structure 17. For example, one or more spacer rods 44 may extend between the hubs of pulley sections 23 and 25 and through appropriate apertures in the hub of pulley section 24. The two pulley sections 23 and 25 may be joined together for simultaneous movement as by the aid of a plurality of long screws 45, also extending through appropriate apertures in the hub of the fixed pulley section 24. The screws 45 serve to clamp the pulley sections 23 and 25 together against the separators 44, thus in effect forming a unitary structure with a long hub. It is thus possible by axial movement of the cylindrical member 41 to adjust the axial positions of the pulley sections 23 and 24 simultaneously. The fixed pulley sections 22 and 24 are similarly formed into a unitary structure having a long hub, by spacers and screws in their hubs passing through clearance holes in the hub of pulley section 23. A fragment of one of these screws is shown in dotted lines and indicated by 411.

A pair of long straight keys, one of which is indicated by 410, are oppositely disposed on shaft 2 and extend through both sections 22—23, and 24—25, of each of pulley structures 17, 18, thereby providing driving relation between shaft 2 and the pulley structures 17 and 18.

The manner in which the member 41 is axially moved will now be described. For this purpose the member 41, which has an external cylindrical surface, is guided by a sleeve-like extension 46 shown as integral with a cover member 47. This cover member 47 may be supported on the right hand wall of the frame or casing 16 by a breech lock similar to that described in connection with the mounting of motor 1. The member 41 is provided with a central threaded boss 48 joined as by the conical wall 49 to the interior of the member 41. The conical wall 49 forms with the cap 42, a lubricant retaining chamber 50 for the thrust bearing structure. The cap 42 may if desired be provided with a felt lubricant retaining washer 51 disposed within a groove in the cap 42 and engaging the exterior cylindrical surface of the hub 36.

Further to maintain lubrication, a lubricant aperture 52 may be provided in the hub of the movable pulley section 23. This may be closed by an appropriate pressure fitting 53 for the accommodation of a lubricant gun.

In order to adjust the member 41 within its guiding sleeve 46, use is made of a rotary lead screw 54 engaging the threaded boss 48. This lead screw has an extension 55 for journaling it in the hub 56 of a flange 57 formed integrally with the cover 47. In order to restrain axial movement of the lead screw 54 this extension 55 carries an external collar 58 engaging the right hand surface of the hub 56. The left hand surface of the hub 56 is similarly engaged by a worm wheel 59 secured to the extension 55 and abutting a shoulder 60 at the right hand extremity of the extension 55. An oil passage may extend through the lead screw structure for passing lubricant into the chamber 50. This aperture may be closed by a pressure fitting 61.

The worm wheel 59 as shown most clearly in Figs. 1 and 2 is arranged to be operated by a multiple thread worm 62. This worm 62 is fixed to a work shaft 63. The worm shaft 63 is rotatably supported at its lower extremity within a boss 64 integral with the flange 57. It is further supported by another hub 65 having an axis normal to the axis of the lead screw 54. It is apparent that by appropriate rotation of the worm shaft 63 the lead screw 54 may be rotated and the axial adjustment of the member 41 thereby accomplished.

In the present instance the rotation of the worm shaft 63 is accomplished through bevel gearing operated manually by a hand wheel 66 fastened to an adjusting shaft 67. This hand wheel carries at its right hand extremity a driving bevel gear 68 meshing with the driven bevel gear 69 mounted on the top end of the shaft 63. The arrangement is such that the position of the hand wheel shaft 67 may be angularly adjusted for convenience about the axis of the worm shaft 63. For this purpose the gears 68 and 69 are shown as accommodated in a gear housing 70 having a detachable cover 71. The gear housing 70 has a flange 72 cooperating with the flanges 73 of the hub 65. The two flanges 72 and 73 may be fastened together by any appropriate fastening means which may be released in order to permit relative rotation of flange 72 with respect to flange 73. The worm shaft 63 of course also passes through the flange 72.

The hand wheel shaft 67 passes through the flanges hub 74 formed on the gear housing 70. In this way the shaft 67 is rotatably supported for rotation of the driving bevel gear 68.

In order to provide a visible indication of the speed adjustment, there is an indicator casing 75 surrounding the shaft 67. This indicator casing has a slot 76 adjacent which a calibrated scale 77 may be supported. Passing through the slot 76 is a pointer 78. This pointer 78 moves axially with respect to the slot 76 to cooperate with the scale 77 as shaft 67 is rotated. For this purpose shaft 67 carries a threaded sleeve 79 attached to the shaft 67 as by a set screw 80. The pointer 78 is mounted on a nut 81 threaded on the sleeve 79. Since the pointer 78 is restrained by the slot 76 from rotation, the rotation of threaded sleeve 79 occasioned by operation of hand wheel 66 causes the pointer 78 to be correspondingly moved in an axial direction.

Provisions may be made for limiting the axial adjustment of the member 41 within its guiding sleeve 46. For this purpose a stop bar 82 is provided which is mounted for axial adjustment in an aperture 83 formed in the flange 57 and having an axis parallel to the axis of lead screw 54. This stop bar 82 has a reduced extension 84 provided with a head 85 at its left hand extremity. The member 41 is provided with a slot 86 adjacent its lower periphery straddling the extension 84. By this arrangement also, the rotation of the member 41 is prevented. The member 41 has abrupt surfaces at the termination of the slot 86 to cooperate respectively with shoulder 87 formed on the bar 82 and with the head 85 formed at the left hand end of this bar. The shoulder 87 and the head 85 thus form limiting stops for the axial movement of the member 41. These stops may be adjusted by moving the bar 82 in an axial direction after loosening the set screw 88 which engages the bar 82 and holds it in any desired axial position.

Before describing in detail the structure associated with the driven pulley structures 19 and 20 it may be noted that the cover member 47 supporting the adjusting mechanism and the end bell 4 of the motor 1 may be interchanged in position with respect to the frame 16. In this way it is possible to support the motor 1 on either the left or right hand wall of the casing 16. Furthermore, the external diameters of the pulley sections 22, 23, 24 and 25 are all somewhat less than the apertures which cooperate with the end bell 4 and the cover member 47. In this way it is possible, as described hereinafter, to remove the pulley sections as a unit through one or the other of the casing apertures.

The driven shaft 21 is shown in this instance as supported in appropriate bearings at its right hand end. For this purpose use is made of a cover member 89 having a central hub 90 through which the shaft 21 passes. The central hub 90 serves to accommodate spaced ball bearing structures 91 and 92. The inner race 93 of ball bearing structure 91 is shown as mounted on the enlarged portion 94 of shaft 21. The right hand edge of the inner race 93 abuts the shoulder 95 provided on the shaft 21. The outer race 96 is accommodated within the hub 90. If desired, a felt lubricant retaining washer 97 may be disposed in an annular groove in the hub 90 for preventing the escape of lubricant along the shaft 21.

Similarly the inner race 98 of the ball bearing structure 92 is accommodated on the extension 99 of the shaft 21. It is held in place against the shoulder 100 on this shaft as by the aid of one or more nuts 101 engaging a threaded portion of the extension 99. The outer race 102 is accommodated within the hub 90. It is held in place by the cap 103 disposed over the outer edge of the hub 90. This cap may also be provided with a felt lubricant retaining washer 104, the washers 97 and 104 forming closed lubricant chamber 105, for appropriate lubrication of these bearing structures.

The extension 99 is further extended to form a load driving end 106 of the shaft 21.

The manner in which the cover member 89 is supported on the wall of the frame 16 will be described hereinafter.

The pulley sections 31 and 32 being fixed to the shaft 21, and being faced oppositely to the fixed pulley sections 22 and 24 of the driving pulley structures 17 and 18, the belts 27 and 28 will remain in alinement irrespective of the adjustment of the effective pulley diameters. This is true because as the belts 27 and 28 move outwardly along the pulley sections 22 and 24, they also move axially toward the left. As this action takes place the belts 27 and 28 move inwardly with respect to the fixed pulley sections 31 and 32 of the driven shaft 21 and are also moved axially toward the left. The fixed pulley sections 31 and 32 and the movable pulley sections 33 and 34 have hubs which are joined together respectively in a manner similar to that described in connection with the driven pulley structures 17 and 18. These pulley sections 31, 32, 33 and 34 may be provided with a pair of long splines as in the case of the driving pulleys for obtaining proper driving relationship between these sections and the shaft 21. Similarly, a lubricating aperture 107 may be provided through the hub of movable pulley section 34.

In the present instance, the movable pulley section 33 is constantly urged toward the right by resilient force, such as that exerted by a compression spring 108 surrounding the left hand extremity of shaft 21. Since the movable pulley section 33 is joined to the pulley section 34, this resilient force is active to move both of these movable pulley sections in unison, and as required by the positive adjustment of the driving pulley structures.

In order that there be a radial as well as a thrust bearing support of the left hand end of shaft 21, the spring 108 is arranged so that its right hand end abuts a shoulder 109 on a sleeve 110 mounted on the hub 111 of the pulley section 33. This sleeve 110 in turn has its right hand end abutting against the inner ball race 112 which is mounted upon the hub 111. The sleeve 110 is held tight against the race 112 by the aid of one or more nuts 113 threaded on the threaded left hand end of the hub 111. The outer ball race 114 is confined within the cylindrical axially movable member 115, as by the aid of a cap 116. This cap 116 has a left hand surface which abuts the right hand edge of the outer race 114. It may be secured in place with respect to the member 115 as by the aid of a number of screws 117. Axial movement of the member 115 is effected by the action of the spring 108 and by the reaction of the belts 27 and 28 on the pulley sections 33 and 34. The spring 108 keeps the belts tight under all conditions of operation.

In order to guide the member 115 in an axial direction, it is mounted for sliding movement in the hub 118 of a cover member 119. The member 115 may carry a spline key 120 adapted to be accommodated in a keyway 121 within the hub 118.

In order to restrain the left hand end of spring 108 from movement, use is made of a collar 122 threaded on the threaded end of the shaft 21. This collar may be held in place by the aid of a lock nut 123.

Lubricant may be confined around the ball bearing structure 112, 114 by the aid of lubricant retaining washers 124 and 125 respectively accommodated in annular grooves in the member 115 and in the cap 116. Lubricant may be passed to the ball bearings by means of a central aperture 126 (Fig. 12) which may be closed by a pressure fitting 127.

The outwardly projecting end of shaft 21 past the hub 118 may be protected as by the aid of a supplemental cover member 128 fastened to the left hand edge of the hub 118.

Due to the interposition of the combination radial and thrust bearing structure between the member 115 and the pulley section 33, the spring 108 may rotate with the shaft without interfering with the axial movement of the sections 33 and 34.

As thus far described, it is clear that upon positive axial adjustment of the pulley sections 23 and 25, the spring 108 acts to keep the pulley sections 33 and 34 in proper position in relation to the active edges of the driving belts 27 and 28. When the driving pulley structures 17 and 18 are made to assume a larger effective diameter, the spring 108 is compressed by the inward movement of the belts 27 and 28 between the respective pulley sections of the driven pulley structures 19 and 20. Conversely, when the effective pulley diameters of the pulley structures 17 and 18 are reduced, the spring 108 acts to urge pulley sections 33 and 34 toward the right to keep them in contact with the belts 27 and 28.

The cover members 89 and 119 are supported respectively on the left and right hand walls of the casing or frame 16. These walls have respectively apertures 129 and 130. The outside diameters of the sections 31, 32, 33 and 34 are such that they may be passed through either of these apertures 129 and 130. The cover members 89 and 119 serve to cover these apertures.

However, interposed between the cover member 89 and the edge of the aperture 129 is an apertured standard 131 having the spaced feet 132 and 133. A similar standard 134 is interposed between the cover member 119 of the edge of the aperture 130. The two standards 131 and 134 are similar in construction and are interchangeable. The standards may be fastened to the edges of the respective apertures, as by the aid of a number of countersunk screws 135, as well as by bolts 136, the latter being long enough to pass through the cover members as well as through the standards. Furthermore, the cover members for the standards and the corresponding walls of the frame or casing 16 nest together. By providing a plurality of angularly spaced holes for the screws 135, 136 it is possible to adjust the angular relationship between the standards 130, 134 and the frame 16. Thus, the bolts and screws 135, 136 are removed, the case rotated about the axis of shaft 21 to as near the desired position as possible, due regard being had to the necessity of lining up the bolt holes, and the bolts and screws are replaced, serving to secure the case in the adjusted position. In this way the axis of the driving shaft 2 may be caused to be angularly adjusted with respect to the axis of the driven shaft 21. This is possible by virtue of the fact that the inter-nested surfaces of the frame 16, the standards 131 and 134 and the cover members 89 and 119 are all coaxial with the axis of shaft 21.

In this manner the adjustment of the mechanism to the required space is facilitated. For example, it is possible by this means to have the axes of both shafts 2 and 21 lie in a common horizontal plane or in a common vertical plane, or in a common plane that is oblique to these two planes, depending on the arrangement of the bolt holes.

By virtue of the fact that the apertures in the walls of the casing 116 are large enough to pass the pulley structures, the removal and replacement of the pulley structures with respect to the casing of frame 16 may readily be accomplished. For example, in order to remove the motor 1 with shaft 2 and the associated pulley structures from the casing, through aperture 29, this may be accomplished by loosening the set screw 83 which holds the stop bar 82 in place. Then the breech lock between the end bell 4 and the casing 16 may be disconnected and the lead screw 54 rotated so as to free it from the member 41. In this way the member 41 is free to pass out of the hub 46, and the entire structure may be moved axially toward the left.

Similarly, in order to move the shaft 21 with its associated pulley structures 19 and 20, it is necessary merely to remove the cover 89 and to withdraw the shaft 21 with its associated structures, through the aperture 129.

By the provision of means, as screws 135, for securing the standards to the frame independently of the cover, the removal of the cover is greatly facilitated; thus by removing bolts 136, the cover, 89 or 119, may be taken off. At the same time the frame is supported as before by standards 131, 134. It is intended that there be a sufficient number of screws 135 and bolts 136, which are interchangeable to suitably secure the covers and standards in place, as well as to permit the desired angular adjustment of the frame about the axis of shaft 21, the screws 135 alternating with the bolts 136.

Once the lead screw 54 is disconnected from the cylindrical member 41, the belts 27 and 28 may be dropped far enough down to permit the pulley structures 19 and 20 to be withdrawn in the manner stated. When this is done, then the belts 27 and 28 may be hung upon the retaining bracket 137, so as to render it possible for the pulley structures 17 and 18 to be moved outwardly through the aperture 29.

The manner in which the device may be reassembled is obvious from the foregoing. Of course in view of the interchangeability of the end bell 4 and the cover 47 it is also necessary that the cover 89 and the cover 119 may similarly be interchanged. In this way the motor 1 may be caused to be supported on either side of the casing 16.

It may sometimes be necessary to remove the spring 108 for replacement or repair. This may readily be done by the aid of a tool shown in use in Fig. 12, without danger of having the spring 108 expand suddenly and possibly cause damage. For this purpose use is made of a screw 138 adapted to be engaged in internal threads provided in the end of the shaft 21. On this screw 138 is threaded a nut 139 that has one or more radial handles 140 for manual manipulation. This nut 139 is adapted to abut the collar 122 after the lock nut 123 is removed. By rotation of nut 139 the force of spring 108 can be gradually reduced. Of course, the supplemental cover 129 must be taken off before this is accomplished.

In case the casing or frame 16 forms an entire enclosure, preferably cover members with ventilating apertures or louvers therein may be provided for the front and back of the casing. Such a cover member is shown in Fig. 11. Air can be drawn in through the louvers past the belts and pulley structures, through the end bell 4 and out through the end bell 3 of the motor 1.

One of the important features of the structure described is the ability to substitute a reducing gear mechanism in place of the cover member 89, so as to obtain a much more slowly rotating load driving shaft. A double reduction gearing mechanism of this character is illustrated in Fig. 3. In this case the driven shaft 141 which replaces shaft 21 is shown as provided with a spiral pinion 142, which meshes with a driven gear 143. This gear in turn serves to drive the pinion 144 in mesh with a gear 145. This gear in turn is attached to a load driving shaft 146 which has load driving extension 147.

The manner in which shaft 141 and the various gears and end shafts are supported will now be described. The cover member 89 now carries but one set of ball bearings 91. The shaft 141, however, has a reduced portion 148 adjacent the pinion 142, and around which another ball bearing structure 149 is provided. The outer race 150 of this ball bearing structure is accommodated in a hub 151 of an extension casting 152. The cap 153 fastened to the left hand edge of the hub 151 serves to retain this outer race 150 in place. The casting 152 may be provided with the air deflecting flange 154. It may be held in place with respect to the cover member 89 as by the aid of a number of long screws 155 which pass through the casting 152, and threaded into apertures provided adjacent the edges of the aperture 129 in casing 16.

The member 152 is supported by a gear housing 156 which may be conveniently made as a casting. This gear housing is provided with a base 157, having anchor bolt apertures 158, for supporting the housing on an appropriate surface, the housing 156 being arranged to support casing 16 in lieu of the standard 131 of Fig. 1. In order that the parts may be interchangeable, however, a spacer member 159 is inserted between the wall of the casing 16 and the cover 89, having the same cross section as the apertured portion of the standard 131 of Fig. 1. This spacer 159, the frame 16 and the cover member 89 inter-nest in the same manner as the corresponding parts in Fig. 1.

The housing 156 is provided with an intermediate wall 160. Adjacent the lower part of the wall as seen in Fig. 3, there is an aperture 161 in which is disposed a ball bearing cage 162. This ball bearing cage 162 supports the outer race 163 of a ball bearing structure 164. This ball bearing structure rotatably supports a shaft 165 upon which the driven gear 143 is supported. The gear 143 as heretofore stated is in mesh with the driving pinion 142.

The shaft 165 also carries the wide driving pinion 144 which is in mesh with the gear wheel 145. The right hand end 166 of shaft 165 is rotatably supported by the aid of a ball bearing structure 167. The outer race of this ball bearing structure is supported in a flange or boss 168 formed integrally with the gear housing 156.

The shaft 146 upon which the driven gear 145 is mounted is supported at its left hand end by the aid of a ball bearing structure 169. The outer race 170 of this ball bearing structure is supported in a hollow boss 171 located above the aperture 161 in the wall 160 as seen in Fig. 3. The right hand end of the shaft 146 is shown as supported by the aid of a ball bearing structure 172. The outer race 173 of this ball bearing structure is supported in a supplemental cover member 174 fastened to a flange 175 formed on the gear housing member 156. This cover member 174 may be provided with a boss 176 in which one or more felt lubricant retaining washers 177 may be disposed.

An oiling disk 178 is shown as fastened to the shaft 146 to distribute the oil in the gear housing members to the various bearing structures. Lubricant may be placed within the housing 156 for this purpose, into which the disk 178 projects.

Whether the mechanism incorporates the reduction gearing of Fig. 3 or not, it is yet possible to adjust the relative angular position of the axis of the driving shaft 2 with relation to the axis of the driven shaft 21 or 141. This is accomplished when the reduction gearing of Fig. 3 is utilized by simply removing and replacing the bolts 155, as described in connection with bolts 135, 136 of Fig. 1.

The intermediate housing 152 is arranged to be fastened to the housing 156 by the aid of the screws 179 which pass through a flange 180 of the member 152 and which are appropriately threaded into threaded apertures in the flange 181 of the housing 156.

In order to supply the lubricant to the gearing housing 156 a filler plug 182 may be provided, leading to a passageway that is in communication with the interior of the housing 156.

In the form just described, a multiple belt drive is disclosed. However, this is not essential in the event that a smaller amount of power need to be transmitted. Thus in the form of Fig. 4, a single belt drive of the same general character as heretofore described is shown. In this instance the casing or frame 183 is shown as being provided with an aperture 184 in its left hand wall for the accommodation of an end bell 185 of an electric motor 186. This end bell 185 may have a breech lock connection with the edge of the aperture 184 as heretofore described. The motor shaft 187 may be rotatably supported by the aid of a ball bearing structure 188 supported in the end bell 185 in a manner quite similar to that disclosed in Fig. 1.

The shaft 187 in this instance carries an axially fixed pulley section 189. This pulley section cooperates with an axially adjustable pulley section 190 forming the variable diameter pulley 191. The hub 192 of the pulley section 189 may be fixed to the shaft 187 as by the aid of a set screw 193. Both pulley sections 189 and 190 may be appropriately splined to the shaft 187, as by one or more keys 412. This adjustable pulley section 190 may be moved in an axial direction by mechanism quite similar to that disclosed in Fig. 1. For example, the hub 194 of the pulley section 190 supports the inner race of a thrust ball bearing structure 195. The outer race is supported in a cylindrical member 196 of the same general construction as cylindrical member 41 of Fig. 1. This member 196 is shown as guided for axial movement in a hub 197 of a cover member 198 for the frame aperture 199. As before, the member 196 is adapted to be axially adjusted by the aid of a lead screw such as 200. This lead screw has a cylindrical extension 201.

In this instance a slightly different form of mechanism for rotating the lead screw 200 is illustrated. Thus instead of a worm and wheel construction, a bevel gear construction is illustrated. A bevel gear 202 is mounted upon the right hand extremity of the extension 201. Its hub is journaled in the end flange 203 of the cover member 198. A collar 204 fastened to the extension 201 outside of the flange 203 may be fastened to the extension 201 to prevent axial movement of the lead screw 200.

In order to rotate the bevel gear 202, there is provided a driving bevel gear 205 mounted on a shaft 206. The axis of this shaft is perpendicular to the axis of lead screw 200. It is journaled in a boss 207 formed on the cover member 198. The shaft 206 projects upward through a boss 208 formed integrally with the gear housing 209. At the top end of the shaft 208 there is disposed a driven bevel gear 210. This bevel gear meshes with a driving bevel gear 211 fastened to a hand wheel shaft 212. This hand wheel shaft 212 may further be supported by a standard 213 fastened to the top of the casing 183. An indicator mechanism 214 may be arranged in a manner similar to that disclosed in Fig. 1.

It is noted that in this case also, the aperture 184 and 199 are large enough to permit the passage of the entire pulley structure through these apertures. This can be accomplished as before by releasing the set screw 215, which holds the stop bar 216 in adjusted position, and by releasing the breech lock between end bell 185 and the aperture 184. Thereupon upon rotation of lead screw 200 the cylindrical member 196 may be freed from the lead screw to permit the motor shaft 187 with its associated pulley structure to be withdrawn from the casing through aperture 184.

The driven shaft 217 in this instance is supported solely by a pair of spaced ball bearing structures 218 and 219. The outer races of these ball bearing structures are accommodated within a hollow boss 220 formed integrally with the cover member 221. This cover member is of the same general construction as cover member 89 of the form shown in Fig. 1. As before, there is interposed a standard 222 between the cover member 221 and the edge of the frame aperture 223. A similar standard 224 is interposed between a cover member 225 at the left hand end of the frame 183 and the edge of the left hand aperture 226.

The driven pulley structure 227 in this instance includes an axially fixed pulley section 228. This pulley section 228 has an elongated hub 229 which is fixed to the left hand extremity of the shaft 217. Splined to the hub 229 is the hub 230 of the movable pulley section 231. This movable pulley section is constantly urged toward the right by the aid of a compression spring 232 disposed around the hub 230. The left hand end of this compression spring is restrained against axial movement by the aid of a collar 233 threaded into the elongated hub 229. A lubricating aperture 234 may be provided through the collar 233.

The driving pulley structure 191 and the driven pulley structure 227 cooperate with an edge active belt 235 which transmits the power from one pulley to the other.

The apertures 223 and 226 in the frame 183 are large enough to permit the pulley structure 227 to pass through them. In order to remove the pulley structures, the same general procedure is followed as in connection with the form shown in Fig. 1. A belt retainer strip 236 may be used upon which to hang the belt 235 while the pulley structures are withdrawn from the casing 183.

In this form also it is possible to adjust the angle of the axis of driving shaft 187 with respect to the axis of driven shaft 217. This is accomplished by removing the bolts 237, 238 which serve to fasten the cover members and the standards to the frame 183.

While as disclosed in Fig. 3, a double reduction gearing may be utilized, it is possible to substitute therefor a single reduction gearing. Such a form is illustrated in Fig. 5. In this case the cover member 221 for the aperture 223 is shown as having a gear housing casting 240 supported thereon by the aid of a plurality of bolts 241 which pass through the housing 240 as well as through the cover member 221, the standard 222 or 131, and into treaded apertures adjacent the edge of the aperture 223.

The gear housing 240 has an intermediate wall 242 by the aid of which the various bearing supports may be supported. This wall 242 also provided an air inlet passage 243 for the interior of the casing.

The driven shaft 244 in this form of the invention carries at its end a driving pinion 245 which meshes with a driven wheel 246. This driven wheel is mounted upon the load driving shaft 247.

The right hand end of shaft 244 in this case is shown as supported by the aid of a ball bearing structure 248. The outer race of this ball bearing structure is accommodated within the hollow boss 249 integral with the wall 242. This outer race is retained in place by cap 250.

The left hand end of the load driving shaft 247 is supported by the ball bearing structure 251 suitably supported in wall 242. The other end of shaft 247 is supported by a ball bearing structure 252. The outer race of this ball bearing structure is accommodated in a cover 253 fastened to the left hand edge of the housing 240.

The chamber 254 formed between the wall 242 and the cover 253 may be utilized as a lubricant chamber. In order to prevent excessive loss of lubricant, felt lubricant retaining washers 255 may be provided in the cap 253. An oiling disk 257 may be fastened to the right hand extremity of the shaft 244 and arranged to have its edge disposed within the lubricant. The shaft 247 may have a tapered portion 258 which serves to guide any lubricant caught on this shaft back into the chamber 254, instead of allowing it to creep outwardly along the shaft 247.

The single reduction gear illustrated in Fig. 5 is interchangeable with the double reduction gear illustrated in Fig. 3. Either of them may be used as required by the conditions of the load. Either the single or double reduction gearing with the housing therefor, may be utilized to cooperate directly with a motor shaft; in this case the gear housing replaces a motor end bell.

It is not necessary that the mechanism incorporate any specific form of reduction gearing. In fact, in some instances a differential reduction gear may be used effectively, especially where it is desired to reduce the speed of the output shaft to comparatively low values. Such a system is described and claimed in a prior application pending in the name of Don Heyer and George T. Pfleger, Serial No. 679,896, filed July 11, 1933, entitled "Variable speed power unit." This type of reduction gear is shown embodied in the form of the invention illustrated in Figs. 6 and 14.

In Fig. 6 the casing or frame 259 is shown as having the same general structure as the casing or frame 16 of the form shown in Fig. 1. In this instance also, the electric motor 260 is shown as mounted by the aid of a breech lock connection between its end bell 261 and the edge of the aperture 262. The driving shaft 263 is supported in general in a manner substantially identical with that illustrated in Fig. 1. In this instance, however, in addition to the two driving pulley structures 264 and 265, the shaft 263 carries a fixed diameter multiple belt pulley structure 266. This multiple belt fixed diameter pulley structure is utilized to drive one of the elements of the differential gearing later to be described. The variation in effective diameter of the two driving pulley structures 264 and 265 is accomplished by the aid of a lead screw mechanism in association with a sliding cylindrical member and a guide, this adjusting structure in general being designated by the reference character 267. The hand wheel 268 for operating the adjusting means is shown as mounted in a vertical position, as for example as by being directly connected to a shaft that operates the lead screw. As before, this adjusting mechanism is supported by the aid of a breech lock connection in the aperture 269 in the frame 259. The motor 260 with shaft 263 and the associated mechanism may be withdrawn through the aperture 262. As before, the position of the motor 260 and the adjusting mechanism 267 may be interchanged with respect to the frame 259.

The multiple driving belts 270 and 271 are shown as in driving relation to a pair of driven pulley structures 272 and 273. These pulley structures are shown as in driving relation with a hollow shaft 274, forming one element in a differential gear drive. This hollow shaft 274 is rotatably supported adjacent its right hand end by the aid of a ball bearing structure 275. The outer race for this ball bearing structure is shown as accommodated in a boss 276 shown as formed integral with a gear housing 277. This gear housing 277 may be provided with a flange 278 overlapping the edges of the aperture 279 in the right hand side of the casing 259. By the aid of the flange 278 the housing 277 may be attached to the frame 259.

The axially adjustable pulley sections 280 and 281 of the driven pulley structures 272 and 273 are urged in unison toward the right by the aid of a compression spring 282 embracing the hub of the section 280. The operation of the pulley structure is substantially the same as that disclosed in connection with the driven pulley structures 19 and 20 of Fig. 1. The left hand end of the spring 282 is restrained against outward movement by the aid of a collar 283, having the sleeve extension 284. This collar is held against a shoulder on the shaft 274, as by the aid of a nut 285 threaded on the threaded extremity of the shaft 274.

The sleeve 284 serves to support a ball bearing inner race 286. The ball bearing 287 is utilized to support the shaft 274 rotatably at its left hand end. The manner in which the outer race 288 of this ball bearing structure is supported will be described hereinafter.

The speed of the shaft 274 is controlled by appropriate manipulation of the hand wheel 268. The motion of shaft 274 is transmitted to one of the elements of a differential gear mechanism. In this instance this differential gear mechanism is shown as including planetary gears, the details of which will be hereinafter described.

Another of the elements of the differential gearing is adapted to be driven by the aid of the shaft 289, which is coaxial with and disposed within the hollow shaft 274. This shaft is rotatably supported at its left hand extremity by the aid of a cover member 290 having a flange which overlaps the aperture 291 in the left hand wall of the casing 259. As before, interposed between the cover member 290 and the edge of aperture 291, there is a standard 292 having supporting feet 293.

Telescoping with the left end of the shaft 289 is the hub 294 of a fixed diameter pulley structure 295. This hub is appropriately fastened to the shaft 289, to be in driving relation therewith, and is held in place as by the aid of one or more nuts 296 threaded on the end of the shaft 289. The hub 294 serves to accommodate the inner races 297 and 298 of spaced ball bearing structures for supporting the left hand end of the shaft 289. In order to space the races 297 and 298 in this manner, use may be made of a spacer sleeve 299.

The outer races 300 and 301 of these bearing structures are accommodated within the hub 302 of the cover 290. A supplemental cover 303 may be provided for the end of the hub 302. This supplemental cover 303 in conjunction with the felt lubricant retaining washer 304 adjacent the right hand end of the hub 302 forms a chamber in which lubricant may be confined for the bearing structures.

In the present instance the pulley 295 cooperates with the driving pulley 266 on the motor shaft 263. These pulleys may be provided with a plurality of V-belts 305. The pulley structure 295 serves to support the outer race 288 for the ball bearing structure that rotatably supports the hollow shaft 274. This is accomplished by providing an appropriately formed recess within the body of the pulley 295. The outer race is held in place by the aid of a flanged ring 306 fastened to a flange 307 formed integral with the body of the pulley structure 295. This flanged ring 306 may carry a lubricant retaining felt washer 308 cooperating with the outer surface of the collar 283. In this way, lubricant may be retained in the space within the body of the pulley 295 in which the ball bearing structure is accommodated.

Provisions are made in connection with pulley structures 295 to maintain the V-belts 305 in proper operative engagement with the grooves of the pulley. For this purpose, a ring 309 of wedge shaped cross section is slidably mounted on the cylindrical cup-like flange 310 of the pulley 295. The opposite surfaces of this ring 309 cooperate respectively with the adjacent sloping surfaces of the belts 305. The pulley structure 295 is also provided with a flange 311 at its left hand end for cooperating with the left hand side of the left hand belt 305. The right hand side of the right hand belt 305 is arranged to be in operative contact with the sloping face of another ring 312, which is also slidable on the cylindrical portion 306. This ring 312 is urged resiliently toward the left, as by the aid of a plurality of compression springs 313. These compression springs are arranged around the periphery of the cylindrical member 306; and their right hand ends abut the flange of a ring 314 fastened to the end of the cylindrical portion 306. In this way a thrust is transmitted not only to the right hand belt 305 but through the belt to the sliding ring 309, for keeping both belts in proper frictional contact with the driven pulley structure. Guides may be provided for the plurality of compression springs 313, as by the aid of the studs 315 fastened to the ring 314.

As thus far described, it is apparent that the shaft 289 has imparted to it a constant speed of rotation, while the hollow shaft 274 has an adjustable speed. In the present instance, the constant speed shaft 289 is shown as having a speed comparable with the lowest speed obtainable for the shaft 274.

These two shafts 274 and 289 are utilized to operate the elements of the differential gear mechanism. Thus the hollow shaft 274 has keyed to it at its right hand end, a spur gear 316 which has an overhanging hub portion 317. Within this hub portion is accommodated the outer race of a ball bearing structure 318, for supporting the right hand end of the constant speed shaft 289. Also, this right hand end of the constant speed shaft 289 carries a spur gear 319.

The gear 316 and the gear 319 are in mesh respectively with pinions 320 and 321 rigidly mounted upon the shaft 322, that is intended to revolve in planetary fashion about the common axis of shafts 274 and 289. It is apparent that by appropriate choice of pitch diameters for the gear members 316, 318, 320 and 321, there will be imparted a planetary motion to shaft 322 which depends upon the relative speeds of shafts 274 and 289.

There may be a plurality of such shafts as 322 with sets of gears 320 and 321 mounted thereon. Under any circumstances the ends of the shaft 322 are mounted in such a way as to permit this planetary motion, and also to impart this planetary motion to a load driving shaft. Thus the left hand end of the shaft 322 is rotatably supported by a ball bearing structure 323. The outer race of this ball bearing structure is accommodated in a cuplike housing member 324. This housing member has a hub portion 325 mounted for free rotation on the shaft 274 as by the aid of the ball bearing structure 326. The right hand end of the shaft 322 is shown as supported by the aid of the ball bearing structure 327. The outer race of this structure is accommodated within an appropriate aperture in a covering disk 328 for the cup-like member 324. This disk is accommodated on the left hand end 329 of a load driving shaft 330. The disk 328 may be attached to the shaft 330 as by the aid of a plurality of screws 331, which engage a flange 332 integral with the shaft 330.

This shaft 330 in turn may be rotatably supported by the aid of the standard 333 fastened to the right hand end of the gear housing 277. This standard 333 is similar in structure to the standard 292 at the left hand end of the apparatus. These two standards may serve to support the frame in any of a plurality of angular positions about the axis of the shafts 274 and 289. The shaft 330 is rotatably supported in the standard 333 by the aid of the ball bearing structure 334. The inner race of this ball bearing structure is fastened to the shaft by the aid of the threaded nut 335. The outer race is accommodated in the boss 336.

In order that the differential gear mechanism may be provided with lubricant, the gear housing 277 may serve to accommodate any appropriate lubricating medium. A felt washer 337 in the boss 276 serves to prevent passage of the lubricant out of the housing 277 toward the left. Similarly, a felt washer 338 may be accommodated in an annular groove in the boss 336 to prevent loss of lubricant at the other end of the gear housing.

The mode of operation is apparent from the foregoing. By appropriate manipulation of the hand wheel 268, the rate of rotation of the load driving shaft 330 may be adjusted within very wide limits. The assembly and replacement of the pulley structures and their associated parts are accomplished in a manner similar to that described in connection with Fig. 1. In order to remove the driven shafts 274 and 289 it may be necessary first to remove the nuts 296 to permit withdrawal of the pulley 295 without disturbing the ball bearing structures 297 and 298. Of course, the apertures 262, 269, 279 and 291 are made large enough to permit passage of the pulley structures out of the casing.

Figure 14:
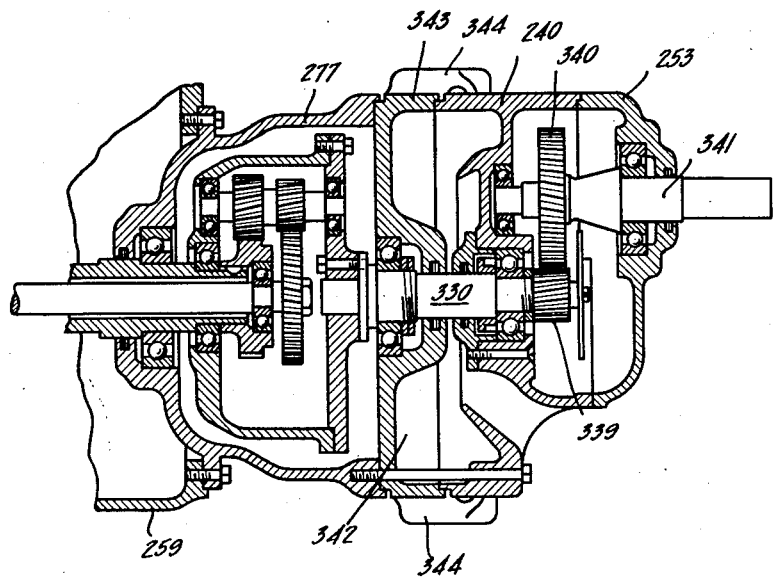
Fig. 14 is a fragmentary sectional view similar to Fig. 5 illustrating the manner in which reduction gearing can be provided for the form of the invention illustrated in Fig. 6.

It may be advisable at times to supplement the differential gear reduction with a further train of reduction gears. This is readily accomplished by supporting the reduction gear by the aid of the gear housing 277. This structure is illustrated in Fig. 14.

In this structure, the shaft 330 is shown as carrying a driving pinion 339 which meshes with a driven gear 340. This driven gear is mounted upon a load driving shaft 341. This reduction gear is entirely similar to the reduction gearing illustrated in Fig. 5, the gear housing casting 240 and its cover 253 being identical with the similarly numbered parts of Fig. 5. However, the standard 342 differs from the standard 333 of Fig. 6 by the addition of a flange 343 for proper interfitting with the left hand edge of the casting 240. This standard 342 of course is provided with appropriate supporting feet 344, and may be utilized to support the entire structure in any one of a number of annular positions about the axis of the driven shafts.

In the form of the invention illustrated in Fig. 1, the motor 1 is shown as directly mounted upon the frame 16 by the aid of the end bell 4. It is possible, however, to provide merely a coupling for the mechanism, and a bracket support for the motor 1 which may later be coupled to the driving shaft. Such an arrangement is shown in Fig. 7. In this form of the invention the driving shaft 345 serves the same function as the driving shaft 2 in Fig. 1. It carries substantially identical driving pulley structures 346 and 347 as in that figure. Furthermore, the effective diameters of these pulley structures may be varied by the aid of the hand wheel 66 as in the first form.

The aperture 348 at the left hand side of the frame 16 in this instance is arranged to form a breech lock connection with a supporting cover structure 349. This supporting cover structure has a hub portion 350. Within this hub portion is accommodated the outer race 351 of the ball bearing structure 352 that supports the left hand end of the shaft 345. This ball bearing structure is held in place against a shoulder 353 on the shaft 345 as by the aid of nuts 354. A cap 355 may be provided for the hub 350 and held in place as by the aid of a plurality of screws 356. The shaft 345 extends outwardly through the cover structure 349 and carries at its outer end a coupling flange 357.

The ball bearing structure 352 may be provided with lubricant, there being a space confined by the hub 350 and cap 355 for this purpose. Lubricant felt retaining washers 358 and 359 may be provided in the manner heretofore described for confining the lubricant within the bearing enclosure.

The driving electric motor 360 is shown in this instance as having a coupling flange 361 adapted to be fastened to the coupling flange 357. The motor as a whole is mounted upon a bracket 413. This bracket has vertical wall 362 fastened to the outside of the cover member 349, as by the aid of a plurality of screws 363. In the adjustment of the apparatus illustrated in Fig. 7, the axes of the driving and driven shafts are in a common vertical plane, which is one of the positions of adjustment of the frame 16 about the axis of the driven shaft. As this plane may be adjusted to an oblique plane or to a horizontal plane as illustrated in Fig. 1, the bracket 413 may be correspondingly adjusted to maintain its position for supporting the motor 360 on a horizontal support.

Instead of the coupling arrangement illustrated in Fig. 7, the source of power may be connected in other ways to the driving shaft. In the form illustrated in Figs. 8 and 9, for example, the frame 364 is shown for enclosing most of the operating parts of the structure. Here the driving shaft 365 is shown as rotatably supported by an end bell structure 185, substantially identical with the end bell structure shown in Fig. 1. In order to provide another bearing support for the shaft 365, it is extended toward the left for accommodating another bearing structure 366. This bearing structure is accommodated in an end bell 367 of the same general structure as the end bell 3 of Fig. 1. The end bell structures 367 and 185 may be fastened to an intermediate supporting standard 368 having the supporting feet 369.

The bearing structure 366 may be urged against the shoulder 370 of the driving shaft 365 by the aid of the nut 371. The outer race 372 is accommodated within the boss 373 of the end bell 367, and is held in place by the cap 374. This cap 374 is fastened as by bolts 375 to the boss 373. As before, lubricant retaining washers 376 and 377 may be provided for retaining lubricant within the chamber formed by the boss 373 and the cap 374.

As in the other forms, the assembly and replacement of the pulley structures may be accomplished in a simple manner. Furthermore, the axes of the driving and driven shafts may be adjusted to lie in a vertical or horizontal plane or an oblique plane, by appropriate manipulation of the bearing standard members 131 and 134. The end bell 367 may also be angularly adjusted with respect to the axis of the driving shaft 365.

Instead of coupling the driving shaft directly to a source of power, this coupling may be effected by other means, such for example as a belt transmission. Such a form is illustrated in Figs. 10 and 11.

In this form of the invention, the frame 16 may be identical with that described in connection with Fig. 1. The driving and driven pulley structures may likewise be similar, as well as the adjusting mechanism including the hand wheel 66. Instead of mounting the source of power directly on the left hand wall of the casing 16, the end bell 378 is mounted there, by the aid of a breech lock in the frame 16. This end bell together with the end bell 379 are generally of the same construction as illustrated in Fig. 8. In this form, however, the bell 378 may be also provided with feet 380. This, together with the feet 381 on the supporting standard 382 intermediate the two end bells 378 and 379, may be utilized for supporting a source of power, such as the electric motor 383. Thus with the end bell 378 and the supporting standard 382 adjusted angularly to bring these feet 380 and 381 in a common angular position, these feet may be used to provide a rest for a flat bracket 384. On this bracket may be supported the electric motor 383. The bracket 384, the standard 382, the end bell 378 and the motor 383 may be appropriately fastened together, as by bolts passing through the feet 381, and through the bracket 384.

The motor 383 is shown as coupled by a pair of belts 385 to a multiple pulley structure 386 mounted on the end 387 of the driving shaft. The motor 383 carries a corresponding multiple belt pulley 388 around which the belt 385 extends.

As before, the angular position of the axis of the driving shaft with relation to the axis of the driven shaft may be adjusted by appropriate manipulation of the main standards 131 and 134. Likewise the end bells 378 and 379 with the standard 382 may be independently angularly adjusted about the axis of the driving shaft.

Figure 13:
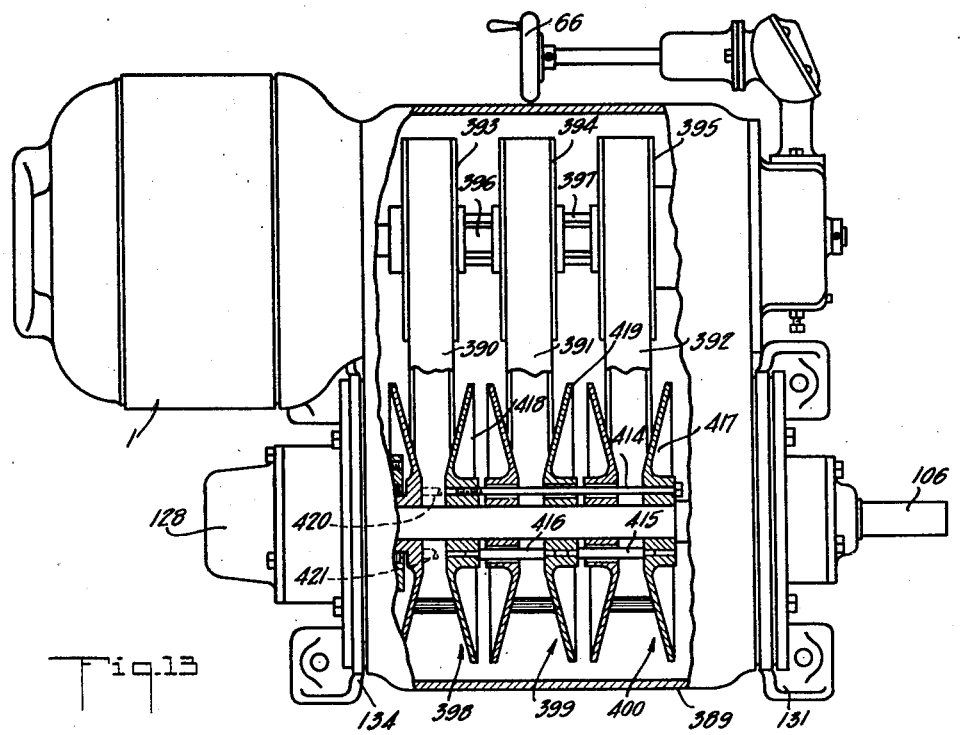
Fig. 13 is a view similar to Fig. 1 of another form of the invention.

Although in Fig. 1 there is illustrated a variable power transmission structure utilizing a pair of belts for transmitting power between the driving and driven shafts, the number of belts and pulleys may be varied. For example, in Fig. 13 the frame 389 is shown wide enough to accommodate a structure utilizing three belts in multiple. These belts are indicated by reference characters 390, 391 and 392. There are three driving pulley structures 393, 394 and 395 upon the driving shaft 396. The electric motor 1 is shown as of identical construction as in Fig. 1.

In order that all three of the adjustable pulley sections of the driving pulley structures be moved simultaneously, the coupling rods 397 may be extended through the intervening fixed pulley sections. This arrangement is illustrated in connection with the driven pulley structures 398, 399 and 400. In all other respects the structure is similar to that illustrated in Fig. 1. They are connected by a number of through bolts and spacers in the same manner as the pulley sections of the double belt arrangement of Fig. 1. The fixed sections are connected as illustrated in connection with the driven pulley structures 398, 399 and 400. Thus a plurality of bolts, one of which is indicated by 414, extend from the fixed section 417 of pulley structure 400 to the fixed section 418 of pulley structure 398, passing through clearance holes in the intervening fixed section 419 of pulley structure 399, as well as in the movable sections of pulley structures 399 and 400. Spacers, as 415, are interposed between fixed sections 417 and 419, and similar spacers 416 are interposed between fixed sections 419 and 418. Thus, the three fixed pulley sections are in effect formed into a unitary structure with a long hub. The adjustable sections are formed into a unit in a similar manner, fragments of the bolts and separators being indicated by dotted lines at 420 and 421.

What is claimed is:

1. In an adjustable ratio transmission mechanism, a driving shaft, a driven shaft, a plurality of adjustable diameter pulley structures on each shaft, each of said pulley structures having a pair of relatively axially adjustable pulley sections with opposed inclined belt engaging faces, forming by relative axial adjustment, variable effective pulley diameters, means for adjusting the relative axial positions of the pulley sections on each shaft, as well as providing a bearing support for said shaft, means connecting the hubs of alternate movable pulley sections so that said sections are slidable as a unit along the associated shaft, a frame for the mechanism, and means providing a second bearing support for each of the shafts and detachably supported by the aid of the edges of apertures in the frame, said apertures being large enough to permit withdrawal of the respective shafts and their pulley structures through the apertures, said adjusting means including an axially slidable thrust bearing structure associated with that section which is farthest from the bearing support for the shaft, a guide means supported on the frame for said thrust bearing structure, and means, detachable from the thrust bearing structure, for axially adjusting said thrust bearing structure.

2. In an adjustable ratio transmission mechanism, a driving shaft, a driven shaft, a plurality of adjustable diameter pulley structures on each shaft, each of said pulley structures having a pair of relatively axially adjustable pulley sections with opposed inclined belt engaging faces, forming by relative axial adjustment, variable effective pulley diameters, means for adjusting the relative axial positions of the pulley sections on each shaft, as well as providing a bearing support for said shaft, means connecting the hubs of alternate movable pulley sections so that said sections are slidable as a unit along the associated shaft, a frame for the mechanism, and means providing a second bearing support for each of the shafts and detachably supported by the aid of the edges of apertures in the frame, said apertures being large enough to permit withdrawal of the respective shafts and their pulley structures through the apertures, said means that provide bearing supports for one of the shafts including standards serving also as a support for the frame, by the aid of which standards the frame may be angularly adjusted about the axis of said one of the shafts.

3. In an adjustable ratio transmission mechanism, a driving shaft, a driven shaft, a plurality of adjustable diameter pulley structures on each shaft, each of said pulley structures having a pair of relatively axially adjustable pulley sections with opposed inclined belt engaging faces, forming by relative axial adjustment, variable effective pulley diameters, means connecting the hubs of alternate movable pulley sections so that said sections are slidable as a unit along the associated shaft, a frame for the mechanism, means providing a bearing support for one end of one of the shafts and detachably supported by the aid of the edge of an aperture in the frame, said aperture being large enough to permit withdrawal of the said one of the shafts and its associated pulley structures through the aperture, a spring associated with that pulley section on the said one of the shafts which is farthest from the bearing support, a slidable thrust bearing structure associated with said section, and a guide means supported on the frame, for said thrust bearing structure.

4. In an adjustable ratio transmission mechanism, a driving shaft, a driven shaft, an adjustable diameter pulley structure on one of the shafts, having a pair of relatively axially adjustable pulley sections with opposed inclined belt engaging faces, forming by relative axial adjustment, variable effective pulley diameters, a frame for the mechanism, means providing a bearing support for one end of one of the shafts and detachably supported by the aid of the edge of an aperture in the frame, said aperture being large enough to permit withdrawal of the said one of the shafts and its associated pulley structure through the aperture, a spring associated with that pulley section which is farthest from the bearing support, a slidable thrust bearing structure associated with said section, and a guide means supported on the frame, for said thrust bearing structure.

5. In an adjustable pulley structure, a shaft, a pair of relatively axially adjustable pulley sections with opposed inclined belt engaging faces, forming by relative axial adjustment, variable effective pulley diameters, a collar threaded on the end of the shaft, a spring abutting the collar and associated with the adjacent section to urge said section axially along the shaft, said shaft having a threaded aperture at its end, a threaded element for engaging said aperture, and a nut member engaging the threaded element serving as an abutment for the collar upon unscrewing the collar from the shaft.

6. In an adjustable ratio transmission mechanism, a driving shaft, a driven shaft, one or more adjustable diameter pulley structures on the driving shaft, one or more pulley structures on said driven shaft, a frame for supporting said shafts, belt means engaging the pulley structures for driving said driven shaft, said driven shaft being hollow, a supplemental shaft extending through the hollow shaft, bearing means for one end of the supplemental shafts, supported by the frame, bearing means for said hollow shaft supported by the bearing means for the supplemental shaft, means transmitting power from the driven shaft to the supplemental shaft, a second bearing means for the other end of the hollow shaft and detachably supported by the frame, and a differential gear mechanism associated with both the hollow shaft and the supplemental shaft adjacent the end where the said second bearing means for the hollow shaft is located.

7. In an adjustable ratio transmission mechanism, a driving shaft, a driven shaft, one or more adjustable diameter pulley structures on the driving shaft, one or more pulley structures on said driven shaft, a frame for supporting said shafts, belt means engaging the pulley structures for driving said driven shaft, said driven shaft being hollow, a supplemental shaft extending through the hollow shaft, bearing means for one end of the supplemental shaft, supported by the frame bearing means for said hollow shaft supported by the bearing means for the supplemental shaft, means transmitting power from the driven shaft to the supplemental shaft, a second bearing for the other end of the hollow shaft and detachably supported by the frame, a differential gear mechanism associated with both the hollow shaft and the supplemental shaft adjacent the end where the said second bearing means for the hollow shaft is located, said second bearing means having a housing extension for the differential gear mechanism, a cover member for the extension, and a load driving shaft extending through the cover member.

8. In an adjustable ratio transmission mechanism, a driving shaft, an adjustable diameter pulley structure on the shaft, said structure having a pair of relatively axially adjustable pulley sections with opposed inclined belt engaging faces, forming by relative axial adjustment, variable effective pulley diameters, a driven shaft, a frame for supporting the shafts, means providing a bearing support for one end of the driving shaft, and detachably supported by the aid of the edge of an aperture in the frame, said aperture being large enough to permit withdrawal of the driving shaft and its associated pulley structure through the aperture, said driving shaft having a coupling extremity extending through said bearing support providing means, and a bracket exterior of the frame, for a source of power, supported by said means.

9. In an adjustable ratio transmission mechanism, a driving shaft, an adjustable diameter pulley structure on the shaft, said structure having a pair of relatively axially adjustable pulley sections with opposed inclined belt engaging faces, forming by relative axial adjustment, variable effective pulley diameters, a driven shaft, a frame for support the shafts, means providing a bearing support for one end of the driving shaft, and detachably supported by the aid of the edge of an aperture in the frame, said aperture being large enough to permit withdrawal of the driving shaft and its associated pulley structure through the aperture, said driving shaft having a coupling extremity extending through said bearing support providing means, a bracket exterior of the frame, for a source of power, supported by said means, and bearing supporting means for the driven shaft, including standards by the aid of which the frame may be angularly adjusted about the axis of said driven shaft.

10. In an adjustable ratio transmission mechanism, a driving shaft, a driven shaft, pulley structures respectively on said shafts, one of said pulley structures having a pair of relatively axially adjustable pulley sections with opposed inclined belt engaging faces, forming by relative axial adjustment, variable effective pulley diameters, a frame for supporting the shafts, means providing a bearing support for one end of the driving shaft, and detachably supported by the frame, said means having provisions for supporting a source of power, said driving shaft extending through said means, and a wheel carried by said driving shaft at its extending end, and adapted to be driven by the source of power, said means being angularly adjustable about the axis of the driving shaft.

11. In an adjustable ratio transmission mechanism, a driving shaft, a driven shaft, pulley structures respectively on said shafts, one of said pulley structures having a pair of relatively axially adjustable pulley sections with opposed inclined belt engaging faces, forming by relative axial adjustment, variable effective pulley diameters, a frame for supporting the shafts, means providing a bearing support for one end of the driving shaft, and detachably supported by the frame, said means including a supporting foot member for a source of power, and adjustable about the axis of the driving shaft, said driving shaft extending through said means, and a wheel carried by said driving shaft at its extending end, and adapted to be driven by the source of power.

12. In an adjustable ratio transmission mechanism, a driving shaft, a driven shaft, pulley structures respectively on said shafts, one of said pulley structures having a pair of relatively axially adjustable pulley sections with opposed inclined belt engaging faces, forming by relative axial adjustment, variable effective pulley diameters, a frame for supporting the shafts, means providing a bearing support for one end of the driving shaft, and detachably supported by the frame, said means having provisions for supporting a source of power, said driving shaft extending through said means, a wheel carried by said driving shaft at its extending end, and adapted to be driven by the source of power, said means being angularly adjustable about the axis of the driving shaft, and bearing supporting means for the driven shaft, including standards by the aid of which the frame may be angularly adjusted about the axis of said driven shaft.

13. In an adjustable diameter pulley structure, a shaft, a pair of pulley sections mounted on the shaft, said pulley sections having opposed inclined faces, forming by relative axial adjustment, variable effective pulley diameters, one of said sections being axially adjustable on the shaft and having a hub, a spring mounted on and surrounding the shaft and exerting a resilient force on the hub to urge the said one of said sections in an axial direction, and means for radially supporting the shaft, including an axially movable member, a radial and thrust bearing structure interposed between said member and said hub, and serving to support the shaft, and a guide for said axially movable member.

14. In an adjustable ratio transmission mechanism, a driving shaft, a driven shaft, cooperating pulley structures respectively on each shaft, belt means engaging the pulley structures, a frame for the mechanism, standards for supporting the frame, said standards being adjustably secured to the frame coaxially with one of said shafts, and means providing bearing supports for said one shaft detachably secured to said standards independently of the frame.

15. In a belt transmission mechanism, including a shaft with a pulley structure thereon and a frame, said frame having apertures disposed coaxially with respect to said shaft, said apertures being large enough to permit withdrawal of the respective shaft and its pulley structure therethrough, a standard adjustably secured to the frame and supporting the frame by the aid of the edges of said apertures, said standards also having apertures large enough to permit passage of the said shafts and its pulley structure, and means providing bearing supports for said shaft and detachably supported by the aid of the edges of the apertures in said standards.

16. In a belt transmission mechanism, including a shaft with a pulley structure thereon, and a frame having apertures with alined cylindrical surfaces coaxial with said shafts, a standard having spaced cylindrical surfaces one of which is adapted to cooperate with the cylindrical surface on the frame for adjustably supporting the frame, means securing the standard to the frame in adjusted position, and means providing a bearing support for the shaft and detachably supported by means of a cylindrical surface which engages the other of said cylindrical surfaces on the standard.

17. A standard adapted to support a frame for a belt transmission mechanism with a shaft, and including a pair of spaced coaxial cylindrical surfaces, one of said surfaces being adapted to engage a cylindrical surface on the frame, the other of said surfaces being adapted to engage a cylindrical surface on a bearing support for said shaft, whereby the standard supports the frame as well as the bearing support, and means to secure the frame and the cover to the standard independently.

18. An adjustable ratio transmission including, a driving shaft and a driven shaft, one or more cooperating pulley structures respectively on each shaft, the pulley structures on at least one of the shafts having adjustable effective diameters, a frame, and belt means engaging the cooperating pulley structures, the combination therewith of means providing bearing supports for the shafts detachably secured on the sides of the frame, means forming a support for the frame, and a reduction gear mechanism including a frame detachably secured to one of said bearing support means to position said mechanism in operative relation to said driven shaft.

19. An adjustable ratio transmission including, a driving shaft and a driven shaft, one or more cooperating pulley structures respectively on each shaft, the pulley structures on at least one of the shafts having adjustable effective diameters, a frame, and belt means engaging the cooperating pulley structures, the combination therewith of means providing bearing supports for the shafts detachably secured on the sides of the frame, means supporting said frame for angular adjustment about the axis of one of said shafts, and a reduction gear mechanism including a frame detachably secured to one of said bearing support means for the driven shaft, so that said mechanism is entirely supported by said means and in operative relation to said driven shaft.

20. An adjustable ratio transmission including, a driving shaft and a driven shaft, one or more cooperating pulley structures respectively on each shaft, the pulley structures on at least one of the shafts having adjustable effective diameters, a frame, and belt means engaging the cooperating pulley structures, the combination therewith of means providing bearing supports for the shafts detachably secured on the sides of the frame, standards supporting the frame for angular adjustment about the axis of said driven shaft, and a reduction gear mechanism including a frame detachably secured to one of said bearing support means for the driven shaft to position said mechanism in operative relation to the driven shaft, said frame of the mechanism comprising one of said standards.

21. An adjustable ratio transmission including, a driving shaft and a driven shaft, one or more cooperating pulley structures respectively on each shaft, the pulley structures on at least one of the shafts having adjustable effective diameters, a frame, and belt means engaging the cooperating pulley structures, the combination therewith of means providing bearing supports for the shafts detachably secured on the sides of the frame, means supporting said frame for angular adjustment about the axis of said driven shaft, and a reduction gear mechanism including a frame and a load driving shaft, means securing said last mentioned frame to one of the bearing support means for the driven shaft for angular adjustment about the axis of the driven shaft whereby said mechanism is in operative relation with said driven shaft, the axis of said load driving shaft being offset radially from the axis of the driven shaft, whereby the relative positions of the transmission frame and of the load driving shaft are independently angularly adjustable about the axis of the driven shaft.

22. An adjustable ratio transmission including, a driving shaft and a driven shaft, one or more cooperating pulley structures respectively on each shaft, the pulley structures on at least one of the shafts having adjustable effective diameters, a frame, and belt means engaging the cooperating pulley structures, the combination therewith of means providing bearing supports for the shafts detachably secured on the sides of the frame, and a reduction gear mechanism including a frame having supporting means, means detachably securing the frame of said mechanism to said bearing support means for the driven shaft on one side of the transmission frame, including mating cylindrical surfaces coaxial with said driven shaft, whereby said mechanism is in operative relation to said driven shaft, supporting means for the transmission frame, means detachably securing said means to the other side of said frame, including mating cylindrical surfaces coaxial with said driven shaft, whereby the transmission frame is angularly adjustable about the axis of the driven shaft.

23. An adjustable ratio transmission including, a driving shaft and a driven shaft, one or more cooperating pulley structures respectively on each shaft, the pulley structures on at least one of the shafts having adjustable effective diameters, a frame, and belt means engaging the cooperating pulley structures, the combination therewith of means providing bearing supports for the shafts detachably secured on the sides of the frame, and a reduction gear mechanism including a frame, supporting means for said frame, means detachably securing the frame of said mechanism directly to one side of the transmission frame including mating surfaces coaxial with said driven shaft, whereby the support for said mechanism frame supports the transmission frame for angular adjustment about the axis of the driven shaft, said mechanism thereby being in operative relation with the driven shaft, and means supporting the transmission frame for angular adjustment about the axis of the driven shaft secured to the opposite side of said frame.

24. An adjustable ratio transmission including, a driving shaft and a driven shaft, one or more cooperating pulley structures respectively on each shaft, the pulley structures on at least one of the shafts having adjustable effective diameters, a frame, and belt means engaging the cooperating pulley structures, the combination therewith of means providing bearing supports for the shafts detachably secured on the sides of the frame, and a reduction gear mechanism including a frame, supporting means for said frame, means detachably securing the frame of said mechanism directly to one side of the transmission frame including mating surfaces coaxial with said driven shaft, whereby the support for said mechanism frame supports the transmission frame for angular adjustment about the axis of the driven shaft, said mechanism thereby being in operative relation with the driven shaft, and means supporting the transmission frame for angular adjustment about the axis of the driven shaft secured to the opposite side of said frame, said reduction gear mechanism including a final gear train having a load driving shaft with its axis offset radially from the axis of the driven shaft, and a supplemental frame for said gear train mounted on the mechanism frame support for angular adjustment about the axis of the driven shaft, whereby the relative positions of the transmission frame and of the load driving shaft are independently adjustable about the axis of the driven shaft.

25. An adjustable ratio transmission including, a drive shaft and a driven shaft, one or more cooperating pulley structures respectively on each shaft, the pulley structures on at least one of the shafts having adjustable effective diameters, a frame, and belt means engaging the cooperating pulley structures, means supporting said frame for angular adjustment about the axis of the driven shaft, comprising a standard detachably secured to one side of the frame, said frame and said standard having cooperating cylindrical surfaces coaxial with the driven shaft, a bearing supporting member detachably secured to the opposite side of the frame, said member and said frame having cooperating cylindrical surfaces coaxial with the driven shaft, said member having bearing means for supporting one end of the driven shaft, a reduction gear mechanism having a frame including bearing means for supporting the opposite end of said shaft, said mechanism frame and said member having cooperating cylindrical surfaces coaxial with the driven shaft, said transmission frame being angularly adjustable about the axis of the driven shaft with respect to said mechanism frame, and means forming a support for the transmission frame adjacent the mechanism frame.

26. An adjustable ratio transmission including, a driving shaft and a driven shaft, one or more cooperating pulley structures respectively on each shaft, the pulley structures on at least one of the shafts having adjustable effecting diameters, a frame, and belt means engaging the cooperating pulley structures, means supporting said frame for angular adjustment about the axis of the driven shaft, comprising a standard detachably secured to one side of the frame, said frame and said standard having cooperating cylindrical surfaces coaxial with the driven shaft, a bearing supporting member detachably secured to the opposite side of the frame, said member and said frame having cooperating cylindrical surfaces coaxial with the driven shaft, said member having bearing means for supporting one end of the driven shaft, a reduction gear mechanism having a frame including bearing means for supporting the opposite end of said shaft, said mechanism frame and said member having cooperating cylindrical surfaces coaxial with the driven shaft, said mechanism frame including a support standard adapted to support the transmission frame for angular adjustment about the axis of the driven shaft.

27. An adjustable ratio transmission including, a driving shaft and a driven shaft, one or more cooperating pulley structures respectively on each shaft, the pulley structures on at least one of the shafts having adjustable effective diameters, a frame, and belt means engaging the cooperating pulley structures, said frame having cylindrical surfaces respectively on opposite sides of the driven pulley and coaxial therewith, said surfaces being substantially identical, a supporting standard for said frame having a cylindrical surface adapted for optional cooperation with either of said surfaces on the frame, said standard having a second cylindrical surface substantially identical with the said surfaces on the frame, means providing a bearing support for at least one end of said shaft and having a cylindrical surface for cooperation with the second cylindrical surface on said standard, and means securing said frame, said standard and said bearing support means in assembled relationship.

28. An adjustable ratio transmission including, a driving shaft and a driven shaft, one or more cooperating pulley structures respectively on each shaft, the pulley structures respectively on each shaft, the pulley structures on at least one of the shafts having adjustable effective diameters, a frame, and belt means engaging the cooperating pulley structures, said frame having cylindrical surfaces respectively on opposite sides of the driven pulley and coaxial therewith, said surfaces being substantially identical, a supporting standard for said frame having a pair of coaxial, axially spaced cylindrical surfaces, one of said surfaces on the standard being substantially identical with the surfaces on the frame, the other surface on the standard being arranged for cooperation with one of said surfaces on the frame, means providing a bearing support for at least one end of said shaft and having axially spaced, coaxial cylindrical surfaces, one of said last mentioned surfaces being adapted for cooperation with the cylindrical surface on the standard not engaged by the frame, the other of said last mentioned surfaces being substantially identical with the surfaces on the frame, a reduction gear mechanism with a frame having a cylindrical surface arranged to cooperate with said other surface on the bearing support, and means to secure said frames, standard, and bearing support in assembled relationship.

THOMAS G. MYERS.